(12) United States Patent
Rice et al.

(10) Patent No.: US 8,864,277 B2
(45) Date of Patent: Oct. 21, 2014

(54) AUTHENTICATION SYSTEMS AND METHODS

(75) Inventors: Huston W. Rice, Vancouver, WA (US);
Erik D. Ness, Vancouver, WA (US);
David B. Novak, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 279 days.

(21) Appl. No.: 13/250,012

(22) Filed: Sep. 30, 2011

(65) Prior Publication Data

US 2013/0083096 A1    Apr. 4, 2013

(51) Int. Cl.
*B41J 29/393*    (2006.01)
*G06F 21/44*    (2013.01)
*B41J 2/175*    (2006.01)

(52) U.S. Cl.
CPC .............. *B41J 2/1753* (2013.01); *G06F 21/44* (2013.01); *B41J 2/17546* (2013.01); *B41J 29/393* (2013.01)
USPC ......................................................... 347/19

(58) Field of Classification Search
USPC ............................................... 347/19, 86, 87
See application file for complete search history.

(56) References Cited

U.S. PATENT DOCUMENTS

| | | |
|---|---|---|
| 7,266,661 B2 | 9/2007 | Walmsley |
| 7,286,773 B2 | 10/2007 | Rommelmann et al. |
| 7,370,932 B2 | 5/2008 | Silverbrook et al. |
| 7,815,287 B2 | 10/2010 | Leigh et al. |
| 2006/0098993 A1 | 5/2006 | Yang |
| 2007/0211292 A1 | 9/2007 | Walmsley |
| 2009/0027439 A1 | 1/2009 | Bauman |
| 2010/0328405 A1 | 12/2010 | Ness et al. |
| 2011/0109938 A1 | 5/2011 | Refstrup |
| 2011/0176175 A1 | 7/2011 | Panshin et al. |

FOREIGN PATENT DOCUMENTS

| | | | | |
|---|---|---|---|---|
| KR | 100565806 | | 3/2006 | |
| WO | WO-2009114019 | * | 9/2009 | ...................... 347/19 |

* cited by examiner

*Primary Examiner* — Julian Huffman

(57) ABSTRACT

In an embodiment, an authentication system includes a base unit to receive a replaceable supply device, a controller integrated into the base unit, known characteristic data accessible by the controller, and an authentication algorithm executable on the controller to authenticate the supply device if a known characteristic measured on the supply device matches the known characteristic data.

12 Claims, 4 Drawing Sheets

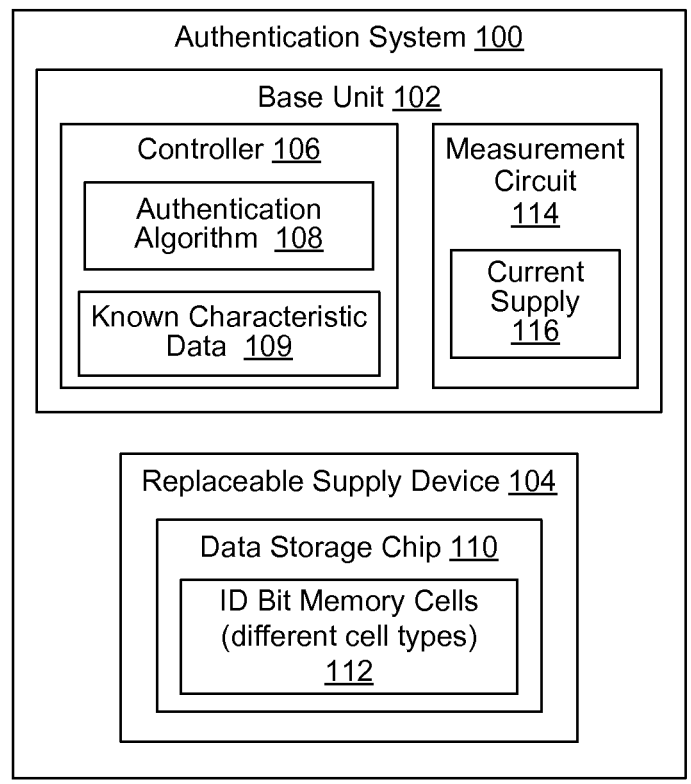
FIG. 1
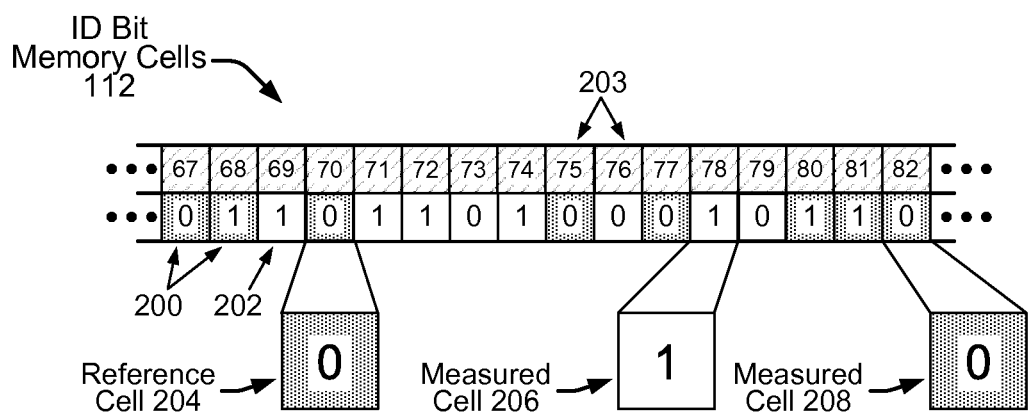
FIG. 2
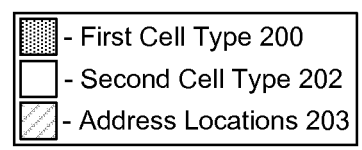

AUTHENTICATION SYSTEMS AND METHODS

BACKGROUND

Many systems have replaceable components that are integral to the functioning of the system. The replaceable components are often devices that contain consumable material that is depleted with each use of the system. Such systems may include, for example, cell phones that use replaceable batteries, medical systems that dispense medicine from replaceable supply devices, printing systems that dispense fluids (e.g., ink) or toners from replaceable supply cartridges, and so on. Verifying that a replaceable device is an authentic device from a legitimate manufacturer can help a system user avoid problems associated with the unintended use of a defective and/or counterfeit device.

BRIEF DESCRIPTION OF THE DRAWINGS

The present embodiments will now be described, by way of example, with reference to the accompanying drawings, in which:

FIG. 1 shows an authentication system that includes a base unit and a replaceable supply device, according to an embodiment;

FIG. 2 shows an example of a string of ID bit memory cells that may be suitable for implementation in a data storage chip, according to an embodiment;

DETAILED DESCRIPTION

Overview of Problem and Solution

Figure 3:
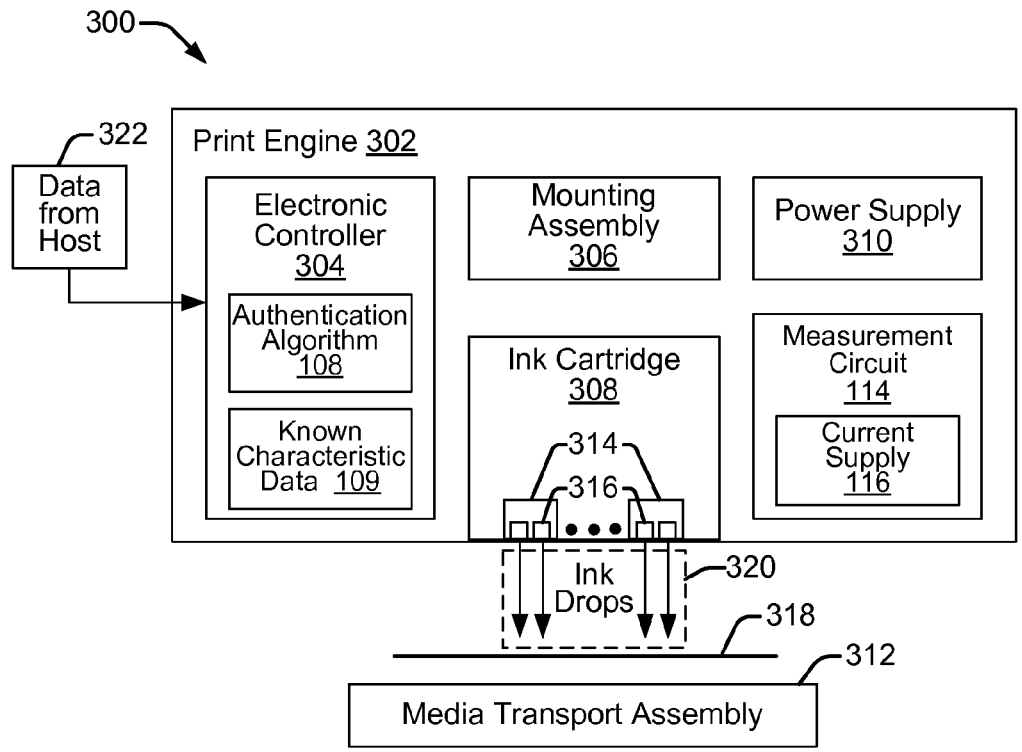
FIG. 3 shows an authentication system embodied as an inkjet printing system, according to an embodiment.

As noted above, verifying the authenticity of replaceable devices for use in certain systems can help system users avoid problems associated with the unintended use of defective and/or counterfeit devices. For example, in printing systems that employ replaceable toner or ink cartridges, the inadvertent use of a counterfeit cartridge can result in various problems ranging from poor quality printouts to leaky cartridges that can damage the printing system.

Prior methods of authenticating a replaceable device have included storing identification data in a data chip on the device and then verifying that the identification data is correct when the device is inserted into the system. For example, in a printing system a print cartridge can incorporate a data storage chip having identification (ID) bit memory cells that are pre-programmed with digital values of logic "1" (high) or logic "0" (low). When a print cartridge is inserted into the printer system, a printer controller determines whether or not the cartridge is authentic by reading (i.e., measuring) the logic values in the ID bit memory cells and comparing them with a threshold value to see if they match expected logic values that were pre-programmed into the memory cells. Thus, the threshold criteria used in this authentication method merely determine whether the ID bit memory cells contain logic high values or logic low values. However, ID bit cells that have significant electrical defects or that have been inappropriately modified (e.g., by a counterfeiter) will also return either a logic high or logic low value when measured. As a result, this method of authentication does not always adequately detect damaged and/or inappropriately modified ID bits, which can lead to the improper authentication of some replaceable devices.

Embodiments of the present disclosure provide robust authentication systems and methods that authenticate replaceable system devices, in general, through the verification of a known characteristic of the replaceable system device. The known characteristic of the replaceable device relates to a characteristic of the ID bit memory cells of a data storage chip on the device. One known characteristic comprises an expected cell type (i.e., cell structure) of a cell. Another known characteristic comprises an expected logic level of a cell. Electrical characteristics of cells within a string of ID bit memory cells are measured and compared with expected values to determine whether each cell provides a match with respect to the expected cell type of the cell. A determination can also be made as to whether each cell provides a match with respect to the expected logic level of the cell. In one embodiment, ID bit memory cells whose measured electrical characteristics do not match an expected cell structure type cause the authentication system to provide a notification (e.g., through a system user interface) that a replaceable system device is defective, damaged, or otherwise not authentic. In another embodiment, ID bit memory cells whose measured electrical characteristics do not match both an expected logic level and an expected cell structure type cause the authentication system to provide such notification.

In one embodiment, for example, an authentication system includes a base unit to receive a replaceable supply device. The base unit includes an integrated controller that accesses known characteristic data and an authentication algorithm. The authentication algorithm is executable on the controller to authenticate the supply device if a known characteristic measured on the supply device matches the known characteristic data.

In another embodiment, a method of authentication includes measuring an electrical characteristic value of a memory cell in a data storage chip of a replaceable supply device and determining from the value, a logic level of the cell and a cell type of the cell. In one implementation, the method includes comparing the logic level to an expected logic level for the cell, comparing the cell type to an expected cell type for the cell, and providing an indication that the replaceable supply device is not authentic if the logic level does not match the expected logic level and/or the cell type does not match the expected cell type.

In another embodiment, an authentication system includes a print engine with a controller, and a replaceable ink cartridge with an ink supply for the print engine. A data storage chip on the cartridge includes different types of identification bit memory cells. An authentication algorithm is executable on the controller to determine if a logic level and cell type of each memory cell match an expected logic level and expected cell type for each memory cell, respectively, and to provide a notification if both the logic level and cell type for each cell do not match.

Illustrative Embodiments

FIG. 1 shows an authentication system 100 that includes a base unit 102 and a replaceable supply device 104, according to an embodiment of the disclosure. The base unit 102 of system 100 includes a controller 106 that typically includes components of a standard computing system such as a processor, memory, firmware, and other electronics for controlling the general functions of the authentication system 100 and for communicating with and controlling supply device 104. In one implementation, controller 106 executes an authentication algorithm 108 to determine the authenticity of the replaceable supply device 104 based on a known characteristic 109 of the device 104. In one embodiment, the known characteristic 109 of the replaceable device 104 can be stored on controller 106 as known characteristic data 109. In other embodiments, the known characteristic data 109 may be stored elsewhere, such as remotely from the system 100, and accessible by the system 100 through a network, for example. The supply device 104 includes a data storage chip 110 that has a number of identification (ID) bit memory cells 112 that are pre-programmed with digital logic values of "1" (high) or "0" (low). The digital values stored in the ID bit memory cells 112 typically provide information about properties of the supply device 104. For example, the memory cells 112 may store information that indicates the type of supply device 104, the type of material contained within the supply device, properties and/or usage characteristics of the material contained within the supply device, and so on.

FIG. 2 shows an example of a string of ID bit memory cells 112 that may be suitable for implementation in a data storage chip 110, according to an embodiment of the disclosure. The number of memory cells shown in the string in FIG. 2 is shown for the purpose of facilitating this description, and is not intended to indicate the actual number of memory cells that may be in a string of ID bit memory cells 112 of a data storage chip 110. The actual number of memory cells in a string of ID bit memory cells 112 may vary, but is typically greater than the number of cells shown in FIG. 2. The ID bit memory cells 112 on data storage chip 110 include at least two different types of memory cells that have different cell structures. In some implementations, however, the ID bit memory cells 112 may include more than two different types of memory cells. In FIG. 2, the example string of ID bit memory cells 112 shows two different types of memory cells. The memory cells are generally referred to as a first cell type 200 and a second cell type 202. Cells of the first cell type 200 are shown in FIG. 2 with shading, while cells of the second cell type 202 are shown without shading. The actual types of ID bit memory cells that are suitable for implementation on a data storage chip 110 include, but are not limited to, MROM cells, PROM cells, EPROM cells, EEPROM cells, fuses and the like. The cell types and their address locations 203 within the string of ID bit memory cells 112 on data storage chip 110, as well as the digital values stored in the memory cells 112, are set at the time of fabrication of the data storage chip 110. Thus, in one embodiment, a known characteristic 109 of a supply device 104 relates to the actual physical structure of the device 104. The known characteristic 109 is the particular cell structure type (e.g., first cell type 200, second cell type 202, etc.) for each cell found at each address location 203 within the string of ID bit memory cells 112 on the data storage chip 110 of the device 104. In another embodiment, the known characteristic 109 of a supply device 104 includes what logic level is stored in each cell at each address location 203 within the string of cells 112 on the device 104.

When a supply device 104 is inserted into or otherwise coupled with the base unit 102 of authentication system 100, the authentication algorithm 108 determines the authenticity of the supply device 104 by verifying a known characteristic of the device 104. The authentication algorithm 108 verifies that each cell within the string of ID bit memory cells 112 matches the known or expected cell type set during fabrication of the device 104. The authentication algorithm 108 can also verify that the digital data (i.e., digital logic level) stored in each ID bit memory cell 112 matches the known or expected data set during fabrication of the device 104. More specifically, the authentication algorithm 108 controls a measurement circuit 114 (e.g., an analog to digital converter circuit) to measure the value of an electrical characteristic of each memory cell and of a known reference cell 204 at a known address location 203 (e.g., address location 70, FIG. 2). The known reference cell 204 is a designated cell programmed to a known value, such as a logic value of "0" (low), that is used to calibrate the measurements taken by measurement circuit 114. The reference cell 204 can be the same cell type or a different cell type as a particular memory cell that is being measured (e.g., measured cell 206 or measured cell 208). Thus, as shown in FIG. 2, the reference cell 204 is of a first cell type 200, while a measured cell 206 (i.e., the particular cell being measured at a given time) is of a second cell type 202.

When directed by the authentication algorithm 108, measurement circuit 114 takes a measurement of an appropriate electrical characteristic of a memory cell within the string of ID bit memory cells 112, such as measured cell 206. The measurement circuit 114 also takes a measurement of the electrical characteristic of the known reference cell 204 within the string of ID bit memory cells 112. The measurements are taken, for example, by passing a known current through the cells from a current supply 116 and measuring the voltage induced across the cells. From the measurement, the algorithm determines the value of the electrical characteristic of each cell. The particular electrical characteristic whose value is measured and used in determining the validity of the cell type and logic level of the cell may be, for example, the voltage across the cell, the impedance of the cell, the resistance of the cell, the capacitance of the cell, the inductance of the cell, some mathematical combination or ratio thereof, and so on. In general, the value of any one or a number of common electrical characteristics known to those skilled in the art may be used in determining the logic level of a cell and the validity of the cell type.

The authentication algorithm 108 uses the electrical characteristic values measured from the reference cell 204 and a measured cell 206 to determine both the digital logic level (i.e., "1" or "0") stored in the measured cell 206, and whether or not the measured cell 206 is of a valid or expected cell type. Because different types of memory cells have different electrical structures, they exhibit different values for various electrical characteristics. For each of the ID bit memory cells 112 in a data storage chip 110, it is pre-established which of the memory cells are a first cell type 200 and which of the cells are a second cell type 202. For example, when the data storage chip 110 is fabricated, some cells may be MROM and some cells may be EPROM. In one embodiment, the pre-established cell types and their address locations 203 within the string of ID bit memory cells 112 are stored as known characteristic data 109 on controller 106. In other embodiments, the known characteristic data 109 is stored elsewhere, such as remotely. In such an embodiment, remotely stored data 109 can be made accessible by controller 106 over a network, via another external storage medium, and so on. Each type of ID bit memory cell 112 (e.g., a first cell type 200, a second cell type 202, etc.) will have unique valid electrical characteristic ranges. The algorithm 108 checks the measured electrical characteristic for each cell against an electrical characteristic range that corresponds with the expected or known cell type (i.e., the known characteristic 109) that was pre-established at the time the data storage chip 110 was fabricated. For example, the electrical characteristic value of a measured cell 206 at a particular address location 203 is checked against a range that corresponds with a second cell type 202, because the measured cell 206 is known at fabrication time to be a second cell type 202. However, the electrical characteristic value of another measured cell 208 at another address location 203 is checked against a range that corresponds with a first cell type 200, because the measured cell 208 is known at fabrication time to be a first cell type 200.

Electrical characteristic values of measured cells (e.g., cells 206, 208) are expected to fall within a certain threshold range of the values measured for the reference cell 204. For example, in one implementation a measured cell 208 may be the same cell type (e.g., a first cell type 200) as the reference cell 204, in which case a measured logic "0" (low) in measured cell 208 may be expected to be very close to the logic "0" (low) of the reference cell 204 due to the common circuit structure shared by both cells. However, a measured cell 206 may be a different cell type (e.g., a second cell type 202) than the reference cell 204, in which case a measured logic "0" (low) in measured cell 206 may be expected to be near the logic "0" (low) of the reference cell, but within a wider tolerance. Similarly, a measured cell 208 that is the same cell type as the reference cell 204 (e.g., a first cell type 200) may have an electrical characteristic value such as impedance, that is expected to be near twice the value of the reference cell 204, while a measured cell 206 that is a different cell type (e.g., a second cell type 202) than the reference cell 204 may be expected to have an impedance that appears as an open circuit. Individual supply devices 104 whose ID bit memory cell measurements fall outside the expected ranges are defective, damaged, or otherwise not authentic. In such cases the authentication algorithm 108 provides a notification regarding the defective, damaged, or non-authentic condition of the supply device 104 to a system user, for example, through a system user interface (not shown).

FIG. 3 shows an authentication system 100 embodied as an inkjet printing system 300, according to an embodiment of the disclosure. In one embodiment, the inkjet printing system 300 includes a print engine 302 having a controller 304, a mounting assembly 306, one or more replaceable supply devices 104 embodied as ink cartridges 308, and at least one power supply 310 that provides power to the various electrical components of inkjet printing system 300. The print engine also includes a measurement circuit 114 with a current supply 116, an authentication algorithm 108 stored and executable on controller 304, and known characteristic data 109 stored on controller 304. Printing system 300 additionally includes media transport assembly 312.

Figure 4:
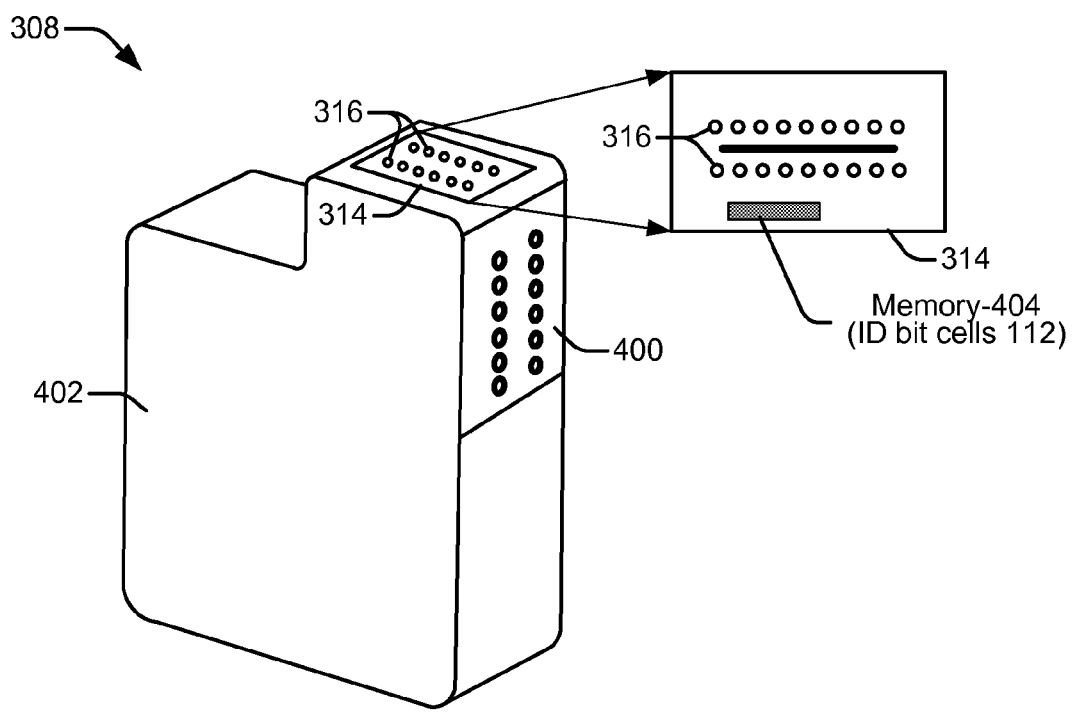
FIG. 4 shows a perspective view of an example inkjet cartridge, according to an embodiment.

FIG. 4 shows a perspective view of an example inkjet cartridge 308 that represents a replaceable supply device 104, according to an embodiment of the disclosure. In addition to one or more printheads 314, inkjet cartridge 308 includes a group of electrical contacts 400 and an ink (or other fluid) supply chamber 402. In some implementations cartridge 308 may have a supply chamber 402 that stores one color of ink, and in other implementations it may have a number of chambers 402 that each store a different color of ink. Electrical contacts 400 carry electrical signals from controller 304 to nozzles 316 on printhead 314 to cause the ejection of drops. Electrical contacts 400 also carry electrical signals to controller 304 from ID bit memory cells 112 in a memory 404 of the printhead 314. In this respect, printhead 314 serves as a data storage chip 110 with a memory 404 that includes ID bit memory cells 112 that function in a manner similar to that discussed above regarding the authentication system 100 of FIGS. 1 and 2.

Referring to FIGS. 3 and 4, printhead 314 ejects drops of ink or other fluid through a plurality of orifices or nozzles 316 toward a print medium 318 so as to print onto print medium 318. Print media 318 can be any type of suitable sheet or roll material, such as paper, card stock, transparencies, Mylar, polyester, plywood, foam board, fabric, canvas, and the like. Printhead 314 can be configured to eject ink through nozzles 316 in a variety of ways. For example, a thermal inkjet printhead ejects drops from a nozzle by passing electrical current through a heating element to generate heat and vaporize a small portion of the ink within a firing chamber. The vapor bubble forces a drop of ink through the nozzle 316. In another example, a piezoelectric inkjet printhead uses a piezoelectric material actuator to generate pressure pulses that force ink drops out of a nozzle. Nozzles 316 are typically arranged in one or more columns or arrays along printhead 314 such that properly sequenced ejection of ink from nozzles 316 causes characters, symbols, and/or other graphics or images to be printed on print media 318 as inkjet cartridge 308 and print media 318 are moved relative to each other.

Mounting assembly 306 positions inkjet cartridge relative to media transport assembly 312, and media transport assembly 312 positions print media 318 relative to inkjet cartridge 308. Thus, a print zone 320 is defined adjacent to nozzles 316 in an area between inkjet cartridge 308 and print media 318. In one embodiment, print engine 302 is a scanning type print engine 302. As such, mounting assembly 306 includes a carriage for moving inkjet cartridge 308 relative to media transport assembly 312 to scan print media 318. In another embodiment, print engine 302 is a non-scanning type print engine 302. As such, mounting assembly 306 fixes inkjet cartridge 308 at a prescribed position relative to media transport assembly 312 while media transport assembly 312 positions print media 318 relative to inkjet cartridge 308.

Electronic controller 304 typically includes components of a standard computing system such as a processor, memory, firmware, and other printer electronics for communicating with and controlling inkjet cartridge 308, mounting assembly 306, and media transport assembly 312. Electronic controller 304 receives data 322 from a host system, such as a computer, and temporarily stores the data 322 in a memory. Typically, data 322 is sent to inkjet printing system 300 along an electronic, infrared, optical, or other information transfer path. Data 322 represents, for example, a document and/or file to be printed. As such, data 322 forms a print job for inkjet printing system 300 that includes one or more print job commands and/or command parameters. Using data 322, electronic controller 304 controls inkjet cartridge 308 to eject ink drops from nozzles 316. Thus, electronic controller 304 defines a pattern of ejected ink drops which form characters, symbols, and/or other graphics or images on print medium 318. The pattern of ejected ink drops is determined by the print job commands and/or command parameters from data 322.

In one embodiment, electronic controller 304 executes authentication algorithm 108 to authenticate inkjet cartridge 308 based on a known characteristic 109 of the cartridge 308 in a manner similar to that discussed above regarding the authentication system 100 of FIG. 1. The authentication algorithm 108 executing on controller 304 controls measurement circuit 114 to measure the value of an electrical characteristic of ID bit memory cells 112 in a memory 404 on printhead 314. Thus, as discussed above with respect to FIG. 2, the measurement circuit 114 measures the value of an electrical characteristic of a known reference cell 204 (at a known address location 203), and of other ID bit cells within the string of ID bit memory cells 112 of memory 404. The authentication algorithm 108 uses the electrical characteristic values to determine both the digital logic level (i.e., "1" or "0") stored in the measured cells (e.g., measure cells 206, 208) and the cell types of the measured cells (e.g., a first cell type 200, a second cell type 202, etc.). Because the logic values of the ID bit memory cells 112 and the cell types of the ID bit memory cells 112 are pre-established at the time of fabricating the printhead 314 (i.e., data storage chip 110) as being a first cell type 200, a second cell type 202, and so on, measured electrical characteristic values for each ID bit memory cell 112 in memory 404 are expected to fall within a certain threshold range that corresponds with a known logic level and a known cell type established at the time of fabrication. As noted above, the known cell types and logic levels can be accessed by controller 304 as known characteristic data 109 stored on controller 304 or otherwise accessible to controller 304 from a remote source such as over a network or on an external storage device. Inkjet cartridges 308 having one or more ID bit memory cells 112 that fall outside of the expected threshold ranges are defective, damaged, or otherwise not authentic.

Figure 5:
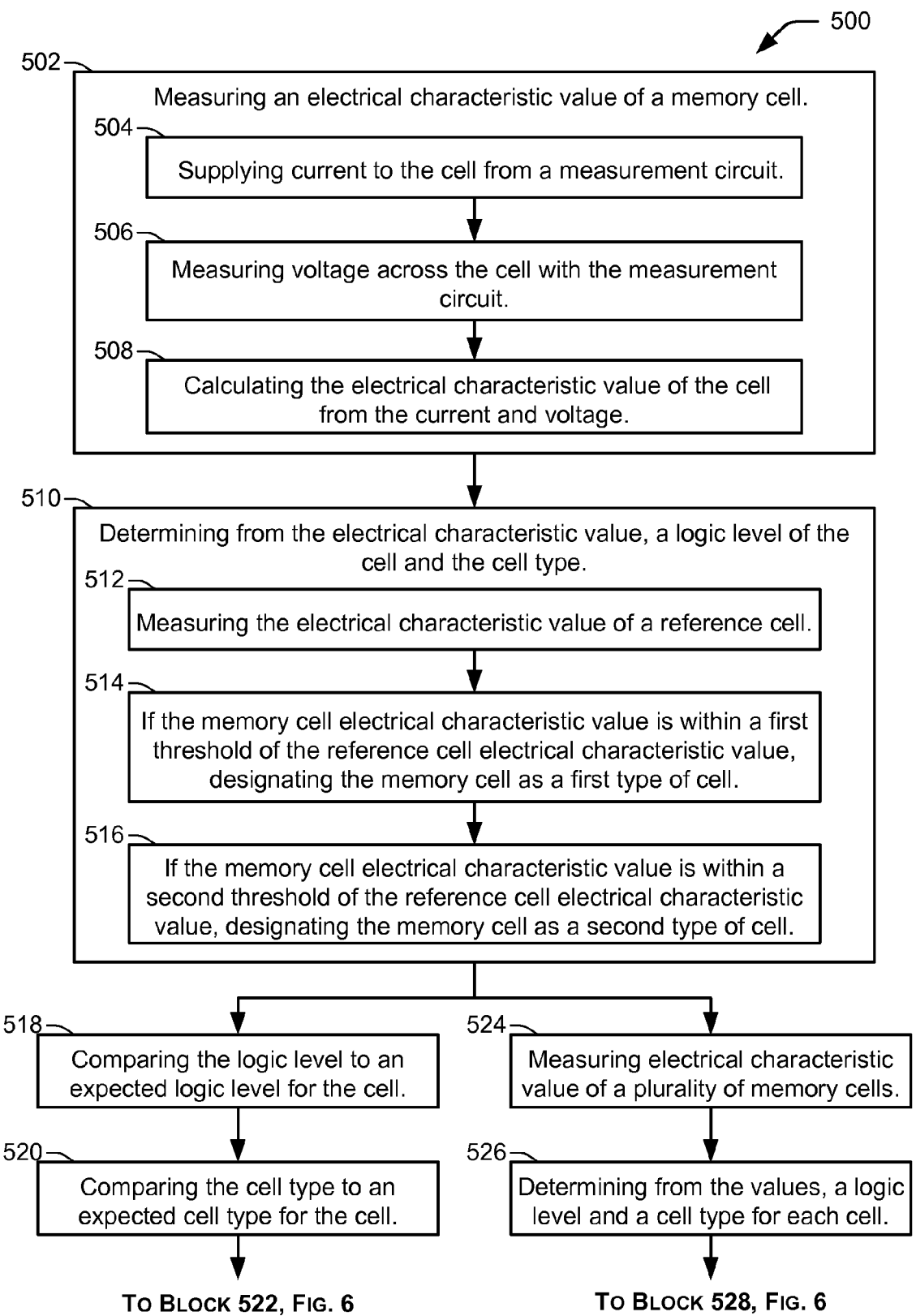
FIG. 5 shows a flowchart of example methods of authentication, according to embodiments.

FIG. 5 shows a flowchart of example methods of authentication 500, according to embodiments of the disclosure. Method 500 is associated with the embodiments discussed herein with respect to FIGS. 1-4. Although the steps of method 500 are presented in a particular order, the order presented is not intended to limit the order in which the steps of method 500 can be implemented. That is, the steps of method 500 may be implemented in different orders as would be apparent to one skilled in the art. Furthermore, the steps of method 500 provide more than one possible variation of a method of authentication. Thus, methods of authentication may be implemented without using all of the steps presented in method 500.

Method 500 begins at block 502 with measuring an electrical characteristic value of a memory cell. The memory cell may be, for example, an ID bit memory cell 112 in a memory 404 of a data storage chip 110 on a supply device 104 of an authentication system 100. A data storage chip 110 may be, for example, a printhead 314 on an inkjet cartridge 308 of a printing system 300. In one implementation, measuring the electrical characteristic value includes supplying current to the cell from a measurement circuit, measuring voltage across the cell with the measurement circuit, and calculating the electrical characteristic value of the cell from the current and voltage, as shown in method 500 at blocks 504-508, respectively.

At block 510 of method 500, a logic level of the cell and whether the cell is a valid cell type are determined from the electrical characteristic value. In one implementation, the logic level and validity of the cell are determined by measuring the electrical characteristic value of a reference cell, as shown at block 512. The method 500 continues at block 514 with designating the memory cell as a first type of cell if the memory cell electrical characteristic value is within a first threshold of the reference cell electrical characteristic value, and at block 516 with designating the memory cell as a second type of cell if the memory cell electrical characteristic value is within a second threshold of the reference cell electrical characteristic value.

Figure 6:
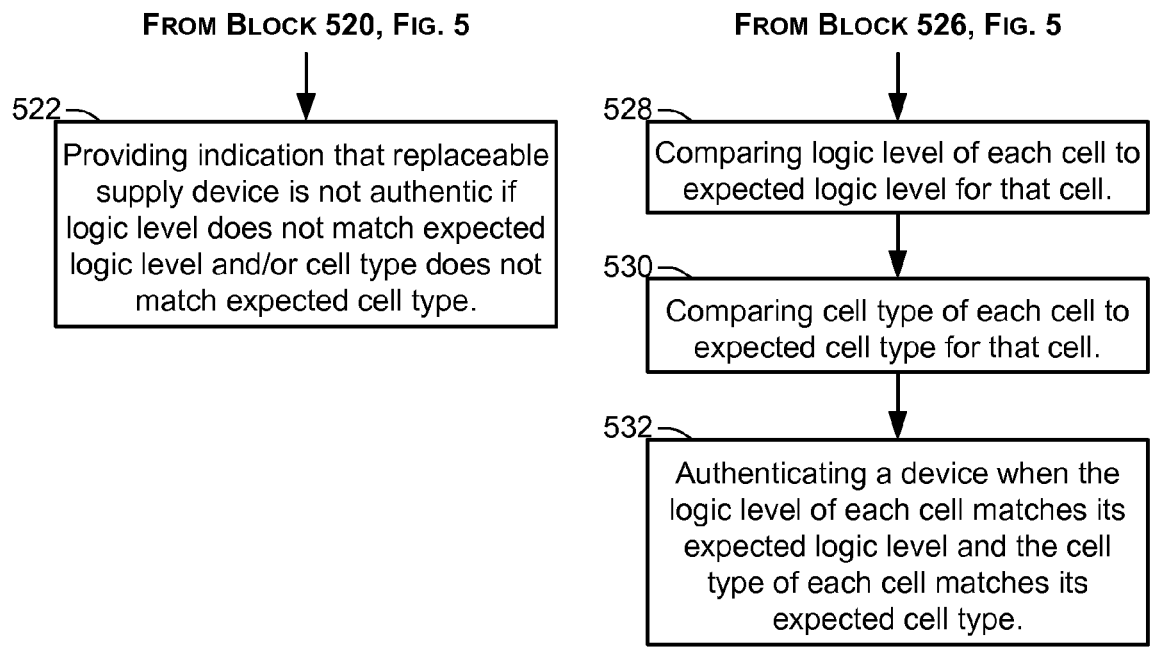
FIG. 6 shows a continuation of the flowchart with example methods of authentication from FIG. 5, according to embodiments.

At block 518 of method 500, the logic level of the cell is compared to an expected or known logic level for the cell, and at block 520 the cell type of the cell is compared to an expected or known cell type for the cell. The known cell types and logic levels for the ID bit memory cells 112 in a memory 404 of data storage chip 110 (e.g., printhead 314) can be accessible for use by a controller 106 (e.g., controller 304 on printing system 300) as known characteristic data 109 either stored on the controller 106 or retrievable from a remote source such as over a network or from an external storage device. Method 500 continues at FIG. 6 with block 522, where a notification is provided that the replaceable supply device is not authentic if the logic level does not match the expected logic level and/or the cell type does not match the expected cell type. Such a notification may be provided, for example, through a user interface of the authentication system 100.

In another implementation, as shown at block 524 of FIG. 5, method 500 includes measuring the electrical characteristic value of a plurality of memory cells. At block 526, this implementation of method 500 includes determining from the electrical characteristic values, a logic level and a cell type for each of the plurality of memory cells. This implementation of method 500 continues at block 528 of FIG. 6 with comparing the logic level of each cell to an expected logic level for that cell. At block 530, the cell type of each cell is compared to the known or expected cell type for that cell. At block 532, when the logic level of each cell matches its expected logic level and the cell type of each cell matches its expected cell type, a device such as a supply device 104 is authenticated.

What is claimed is:

1. An authentication system comprising:
a base unit to receive a replaceable supply device;
a controller integrated into the base unit;
known characteristic data accessible by the controller, the known characteristic data comprising known cell types for each cell in a string of identification (ID) bit memory cells on the supply device; and
an authentication algorithm executable on the controller to authenticate the supply device if a known characteristic measured on the supply device matches the known characteristic data.

2. An authentication system as in claim 1, wherein the known characteristic data comprises known logic levels for each cell in a string of identification (ID) bit memory cells on the supply device.

3. An authentication system as in claim 1, wherein the supply device comprises:
a data storage chip;
a string of identification (ID) bit memory cells on the data storage chip; and
at least two different cell types in the string of ID bit memory cells.

4. An authentication system as in claim 3, wherein the ID bit memory cells comprise a reference cell to provide a reference value of an electrical characteristic to compare with electrical characteristic values measured in each of the ID bit memory cells.

5. An authentication system as in claim 4, wherein the electrical characteristic is selected from the group consisting of a cell voltage, a cell impedance, a cell resistance, a cell capacitance, a cell inductance, a mathematical combination of any of such electrical characteristics, and a ratio of any of such electrical characteristics.

6. An authentication system as in claim 3, wherein the different cell types comprise:
a first cell type with an electrical characteristic having a first value; and
a second cell type with the electrical characteristic having a second value.

7. An authentication system as in claim 3, wherein the different cell types are selected from the group consisting of MROM cells, PROM cells, EPROM cells, EEPROM cells and fuses.

8. An authentication system as in claim 1, wherein the base unit further comprises a measurement circuit to measure the known characteristic on the supply device.

9. An authentication system as in claim 8, wherein the measurement circuit comprises:
- a current supply circuit to supply current to cells in a string of ID bit memory cells on the supply device; and
- an analog to digital convertor circuit to measure an electrical characteristic value of each cell induced by the current.

10. An authentication system as in claim 1, wherein the base unit comprises a printing system and the supply device comprises an inkjet cartridge.

11. An authentication system as in claim 1, wherein the known characteristic data is stored on the controller.

12. An authentication system comprising:
- a print engine with a controller;
- a replaceable ink cartridge with an ink supply for the print engine;
- a data storage chip on the cartridge with different types of identification bit memory cells;
- an authentication algorithm executable on the controller to determine if a logic level and cell type of each memory cell match an expected logic level and expected cell type for each memory cell, respectively, and to provide a notification if both the logic level and cell type for each cell do not match.

* * * * *